Patented Dec. 17, 1940

2,225,542

UNITED STATES PATENT OFFICE 2,225,542

PREPARATION OF UNSATURATED CARBONYLIC COMPOUNDS

Clyve C. Allen, San Francisco, and Vernon E. Haury, El Cerrito, Calif., assignors to Shell Development Company, San Francisco, Calif., a corporation of Delaware No Drawing. Application April 4, 1939, Serial No. 265,968

7 Claims. (Cl. 260—595)

This invention relates to a process for the preparation of unsaturated carbonylic compounds. The invention is concerned more particularly with the pyrolysis of carboxylic esters of aldols and carboxylic esters of ketols to produce unsaturated aldehydes and unsaturated ketones.

Unsaturated aldehydes have been prepared by the condensation of saturated aldehydes, the decomposition of aldols with the aid of dehydrating agents, the oxidation of unsaturated primary alcohols, and the decomposition of glycerol and dialkyl ethers of homologous glycerols. The known methods of synthesizing unsaturated ketones are somewhat more extensive including the condensation of saturated ketones, the chemical dehydration of ketols, the removal of hydrogen chloride from chloroketones with such substances as diethylaniline, the oxidation of unsaturated secondary alcohols, the reaction of unsaturated halides with acid nitriles and zinc, the condensation of ethylene with carboxylic acid chlorides, and the hydration of vinyl acetylene. Although these methods are all operable from a chemical standpoint, each is lacking in certain features which permit the commercial production of unsaturated aldehydes and ketones, and some of the methods are limited to the preparation of compounds wherein the olefinic linkage is located in only a single position with relation to the carbonyl group.

It is an object of the present invention to provide a process permitting the production of unsaturated carbonylic compounds which have the olefinic linkage located in any possible position with respect to the carbonyl group. A further object of the invention resides in a method for preparing unsaturated aldehydes and ketones which is suitable for the commercial production of these valuable substances.

We have discovered that unsaturated ketones may be prepared by pyrolyzing carboxylic esters of ketols and also that the pyrolysis of carboxylic esters of aldols yields unsaturated aldehydes. The method is a general one by means of which any desired unsaturated aldehyde or ketone may be prepared by pyrolyzing an appropriate aldolester or ketol-ester. The material resulting from the pyrolysis contains, in addition to the unsaturated carbonylic compound, some unchanged ester of the aldol or ketol, carboxylic acid and incidental decomposition products. This material may be separated into its constituents and the unchanged ester may be reutilized in the process while the carboxylic acid may be employed to prepare additional ester of the aldol or ketol.

The carboxylic esters of aldols which may be used in the process may be conveniently represented by the general formula:

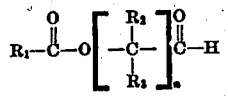

wherein $R_1$ designates a hydrogen atom or an organic radical including alkyl groups such as methyl, ethyl, propyl, isopropyl, butyl, isobutyl, secondary butyl, tertiary butyl, etc.; alkenyl groups such as vinyl, allyl, isopropenyl, crotyl, etc.; aryl or aralkyl groups such as phenyl, tolyl, xylyl, naphthyl, benzyl, phenylethyl, phenylpropyl, etc.; alicyclic groups such as cyclopropyl, cyclobutyl, cyclopentyl, cyclohexyl, etc.; heterocyclic groups such as thienyl, pyrrolyl, furyl, etc.; and their homologues and analogues as well as these groups with one or more of their hydrogen atoms substituted by a suitable inorganic or organic substituent such as a halogen atom, a hydroxy group, a carbinol group, a carboxylic acid group, an alkoxy group, an aralkoxy group, an aryl oxy group, and the like. The subscript $n$ is an integer of at least one and it denotes the number of times the group

occurs in the molecule. It is evident that in order to obtain an unsaturated aldehyde by the process the group

must contain at least two carbon atoms when $n=1$. In this group, $R_2$ and $R_3$ designate identical or dissimilar radicals like those described for $R_1$, but according to the definition of the group

$R_2$ and $R_3$ cannot both be hydrogen atoms when $n=1$. When $n$ is greater than one, the group

occurs $n$ times in the molecule and the $R_2$ groups do not have to be identical radicals nor need the R₃ groups be the same radicals. The group

may also designate a cyclic group by having a carbon atom of one of the R groups linked to the carbon atom of another R group or one of the

e. g. it may represent

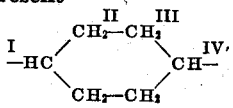

when $n=4$ and an R₃ group linked to the

is ethyl with a further linkage to the

while the other R₂ and R₃ radicals are hydrogen atoms.

The carboxylic esters of ketols which may be pyrolyzed according to the process of our invention to yield unsaturated ketols may be represented by the general formula:

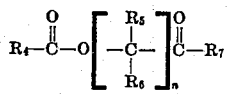

wherein R₄ may be a hydrogen atom and R₄ and R₇ may be organic radicals like those described above for R₁ in the formula of the esters of aldols. The number of times the group

occurs in the molecule is indicated by $n$ which is an integer of at least one. When $n=1$ the group

must contain at least two carbon atoms. The group

may represent any configuration of atoms as was described for the group

[R₂ | -C- | R₃]ₙ

When $n$ is an integer greater than one, the group

occurs $n$ times in the molecule wherein the R₂ groups may be similar or dissimilar radicals and the R₃ groups may also be like or unlike radicals.

The process of the invention may be executed in a variety of suitable manners. For example, the ester of an aldol or a ketol may be vaporized and fed into a suitable vessel heated to the desired temperature where the decomposition of the ester by pyrolysis proceeds. The products of the pyrolysis may then be conducted from the heated vessel to a device or devices for cooling and condensing them. Metal tubes are well suited for the vessel in which the pyrolysis may take place. Either a single tube or a series of tubes may be used and these may be mounted in a furnace to supply the heat. If desired, the material to be pyrolyzed may be vaporized directly in these tubes instead of a separate vessel. To promote turbulence of the vapors and assist the heat transfer, the tubes may be packed with various materials which are substantially inert, but which permit passage of the vapors through the tube. Reference is made to packing the tubes with such materials as quartz chips, ceramic substances, scrap iron, carbon particles, charcoal, glass which does not melt at the pyrolysis temperatures, and the like.

It may be advantageous to conduct the pyrolysis of the esters in the presence of diluents such as water and inert gases. Representative inert gases include nitrogen, hydrogen, carbon monoxide, carbon dioxide, methane, ethane, propane, butane, ethylene, propylene, butylene. Gases containing oxygen should be avoided. In order to recover the products when gases are used as diluents, the material from the pyrolysis chamber may be cooled and condensed and then the remaining gases passed to one or more washing apparatus to remove any additional material therefrom. To avoid loss of valuable products, any gases formed by the pyrolysis, even in the absence of added diluent, may be scrubbed to recover products remaining in the gases.

The temperature at which the pyrolysis may be conducted is largely governed by the particular ester of the aldol or ketol pyrolyzed, and by the time of contact in the heated zone. In general, temperatures above 350° C. are preferred. The esters prepared from aldols or ketols with the hydroxy group linked to a tertiary carbon atom usually pyrolyze at a lower temperature than esters prepared from aldols or ketols with the hydroxy group linked to a primary or secondary carbon atom. Although the ester of an aldol or ketol could be pyrolyzed under conditions so that all of the ester would be decomposed, this would not be desirable because the conditions would be so drastic that the desired products would also decompose. The best temperature and time of contact for a particular ester so that the optimum yield of unsaturated carbonylic compound is obtained may be determined most suitably by experiment. It may be pointed out however, that in general, the higher the temperature, the shorter is the time of contact to produce a given conversion of ester to products, and also the higher the temperature, the larger is the amount of ester, unsaturated carbonylic compound, and carboxylic acid decomposed into various secondary products incidental to the process.

The pyrolysis may usually be conducted satisfactorily at ordinary atmospheric pressures. It is usually convenient to operate the pyrolysis chamber, the cooling and condensing apparatus, and the washing apparatus at substantially the same pressure, and, since recoveries of products are more complete at elevated pressures, it may be desirable to use superatmospheric pressures for the pyrolysis.

The position of the olefinic linkage in relation to the carbonyl group in the unsaturated aldehydes or ketones produced by the process may be controlled by pyrolyzing an appropriate aldolester or ketol-ester. The pyrolysis of the ester causes the removal of a hydrogen atom from a carbon atom contiguous to the carbon atom linked to the carboxylic group. When the ester is of such a nature that the hydrogen atom may be supplied from either of two carbon atoms, the resulting product will consist of a mixture of two isomeric compounds which have olefinic linkages in two different positions with respect to the carbonyl group. On the other hand, when only one possibility is present in the ester for the hydrogen atom to be removed, the unsaturated aldehyde or ketone will consist of a single compound with the olefinic linkage in only one relation to the carbonyl group. For example, the acetate of pentanol-3-one-4 pyrolyzes to yield only one product, pentene-2-one-4, according to the equation:

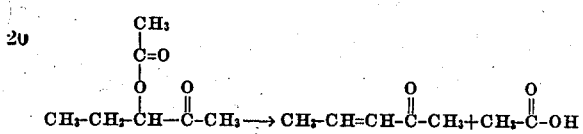

This is also true of the acetate of pentanol-1-one-4, except in this case the product is pentene-1-one-4.

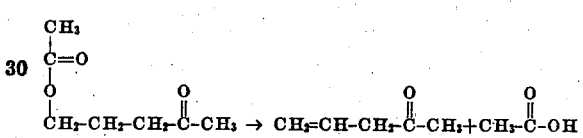

However, the pyrolysis of the acetate of pentanol-2-one-4 yields two isomeric products, pentene-1-one-4 and pentene-2-one-4.

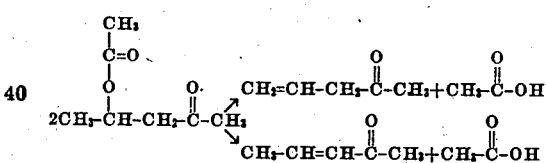

The separation of the products from the pyrolysis into individual constituents may be accomplished in any known manner such as by distillation, for example. The separation of the product yields the desired unsaturated carbonylic compound, some unchanged ester of the aldol or ketol which may be returned to the process, a carboxylic acid resulting from the pyrolysis which may be used to prepare the ester, and incidental products which may be disposed of usually.

The unsaturated aldehydes and ketones containing an unsaturated carbon atom linked directly to the carbonyl group and with a methylene group linked directly to the said unsaturated carbon atom polymerize easily so that in the recovery and separation of these materials it is desirable to have a polymerization inhibitor present. Suitable substances for inhibiting the polymerization of the products include phenolic compounds, quinones, amines, alkylolamines, and nitro aryl compounds as well as inorganic substances such as sulfur, selenium, tellurium, the halogens, copper and the copper alloys.

The unsaturated aldehydes and ketones produced by the process are useful for a variety of purposes. Some may be polymerized into resins for the preparation of various articles, coating compositions, impregnating compositions, etc. Others are suitable as solvents for various substances, as intermediate chemicals for the preparation of pharmaceuticals, as raw materials in the manufacture of other valuable compounds, etc.

The following examples are given for the purpose of illustrating the process of our invention.

*Example I*

Acetoin acetate was pyrolyzed in a glass tube packed with 4 to 6 mesh quartz chips and heated by electrical means. The free volume of the packed tube was about 85 cc. No preheater was used and the actual zone at reaction temperature was estimated to be about 75% of the total heated tube length or about 64 cc. The temperature was determined by means of a thermocouple located in the center of the pyrolysis tube. The acetoin acetate was introduced into the tube at a uniform rate by means of a calibrated drop counter and a stream of inert gas. The liquid products were collected, after issuing from the tube and traversing a water-cooled condenser, in a receiver maintained at about 20° C. and additional material was removed from the gases with traps held at approximately −80° C. The liquid products were examined by first adding about 3% by weight of hydroquinone and then distilling to about 160° C. to obtain the reacted material followed by collecting a distillate boiling between about 160° C. and 170° C. to recover the unchanged acetoin acetate. The results of the experiment were as follows:

| | |
|---|---|
| Temperature, °C | 470±2 |
| Period, hrs | 2.67 |
| Acetoin acetate in, gm | 122 |
| Nitrogen in, liters at 20° C | 8.5 |
| Liquid product out, gm | 120 |
| Distillate to 160° C., gm | 32 |
| Distillate from 160° C. to 170° C., gm | 80 |
| Monomeric methyl vinyl ketone obtained, gm | 10 |
| Acid obtained, gm | 18 |

*Example II*

Acetoin acetate was pyrolyzed in the same apparatus as described in Example I under somewhat different conditions with the following results:

| | |
|---|---|
| Temperature, °C | 470±2 |
| Period, hrs | 3.75 |
| Acetoin acetate in, gm | 75 |
| Nitrogen in, liters at 20° C | 7.2 |
| Liquid products out, gm | 68 |
| Distillate to 160° C., gm | 30 |
| Distillate from 160° C. to 170° C | 36 |
| Monomeric methyl vinyl ketone obtained, gm | 12 |
| Acid obtained, gm | 14 |

*Example III*

Acetoin acetate was pyrolyzed at a lower temperature in the apparatus described in Example I with the following results:

| | |
|---|---|
| Temperature, °C | 425±5 |
| Period, hrs | 7 |
| Acetoin acetate in, gm | 151 |
| Nitrogen in, liters at 20° C | 7.1 |
| Liquid products out, gm | 150 |
| Distillate to 160° C | 34 |
| Distillate from 160° C. to 170° C | 114 |
| Monomeric methyl vinyl ketone obtained, gm | 10 |
| Acid obtained, gm | 15 |

From the data of the foregoing three examples the following conversions and yields may be calculated:

|  | Example | | |
|---|---|---|---|
|  | I | II | III |
| Temperature, °C | 470 | 470 | 425 |
| Contact time, sec | 8 | 16 | 19 |
| Acetoin acetate in, mols | 0.940 | 0.577 | 1.153 |
| Acetoin acetate out, mols | 0.615 | 0.277 | 0.877 |
| Acetoin acetate reacted, mols | 0.325 | 0.300 | 0.276 |
| Acid formed calculated as acetic, gm | 0.300 | 0.240 | 0.250 |
| Methyl vinyl ketone formed, mols | 0.143 | 0.172 | 0.143 |
| Acetoin acetate reacted per pass, percent | 34.6 | 52.0 | 23.9 |
| Converted to methyl vinyl ketone, mol percent | 15.2 | 29.8 | 12.4 |
| Yield, mol percent | 44.0 | 57.3 | 51.8 |

We claim as our invention:

1. A process for the production of methyl vinyl ketone which comprises effecting the pyrolysis of acetoin acetate in the presence of a substantially inert gas.

2. A process for the production of methyl vinyl ketone which comprises pyrolyzing acetoin acetate.

3. A process for the production of an unsaturated ketone which comprises pyrolyzing a compound selected from the class consisting of compounds represented by the general formula

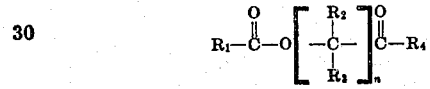

wherein $R_1$, $R_2$ and $R_3$ are hydrogen atoms or hydrocarbon radicals, $R_4$ is a hydrocarbon radical, $n$ is an integer of at least one which indicates the number of times the group

occurs in the molecule, and when $n=1$, the group

contains at least two carbon atoms.

4. A process for the production of an unsaturated aldehyde which comprises pyrolyzing a compound selected from the class represented by the general formula:

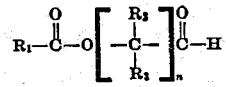

wherein $R_1$, $R_2$ and $R_3$ are hydrogen atoms or hydrocarbon radicals, $n$ is an integer of at least one which indicates the number of times the group

occurs in the molecule, and when $n=1$, the group

contains at least two carbon atoms.

5. A process for the production of an unsaturated carbonylic compound which comprises pyrolyzing at a temperature above 350° C. a compound selected from the class consisting of carboxylic esters of aldols and carboxylic esters of ketols in the presence of a substantially inert diluent.

6. A process for the production of an unsaturated carbonylic compound which comprises pyrolyzing at a temperature above 350° C. a compound selected from the class consisting of carboxylic esters of aldols and carboxylic esters of ketols.

7. A process for the production of an unsaturated carbonylic compound which comprises pyrolyzing a compound selected from the class consisting of carboxylic esters of aldols and carboxylic esters of ketols.

CLYVE C. ALLEN.
VERNON E. HAURY.